United States Patent
Kramer et al.

(10) Patent No.: US 6,902,717 B2
(45) Date of Patent: Jun. 7, 2005

(54) PROCESS FOR THE CATALYTIC PARTIAL OXIDATION OF A HYDROCARBONACEOUS FEEDSTOCK

(75) Inventors: Gert Jan Kramer, Amsterdam (NL); Jurjen Wietze Van Der Meer, Amsterdam (NL); Coen Willem Johannes Pieterse, Amsterdam (NL); Ronald Jan Schoonebeek, Amsterdam (NL); Hendrik Martinus Wentinck, Amsterdam (NL); Eric Sevenhuijsen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 148 days.

(21) Appl. No.: 10/149,680

(22) PCT Filed: Dec. 19, 2000

(86) PCT No.: PCT/EP00/13059

§ 371 (c)(1),
(2), (4) Date: Jun. 13, 2002

(87) PCT Pub. No.: WO01/46068

PCT Pub. Date: Jun. 28, 2001

(65) Prior Publication Data

US 2002/0192154 A1 Dec. 19, 2002

(30) Foreign Application Priority Data

Dec. 21, 1999 (EP) .............................. 99310347

(51) Int. Cl.⁷ ............................................... C01B 3/26
(52) U.S. Cl. .................... 423/651; 423/418.2; 252/373; 429/12
(58) Field of Search .............................. 423/418.2, 651; 252/373; 429/12

(56) References Cited

U.S. PATENT DOCUMENTS

| 4,788,004 A | * | 11/1988 | Pinto et al. .................. 252/373 |
| 6,221,280 B1 | * | 4/2001 | Anumakonda et al. ..... 252/372 |

FOREIGN PATENT DOCUMENTS

| EP | 0 287 238 | | 10/1988 | ............. C01B/3/38 |
| WO | 99/19249 | | 4/1999 | ............. C01B/3/00 |
| WO | WO 99/37580 | * | 7/1999 | |

* cited by examiner

Primary Examiner—Stanley S. Silverman
Assistant Examiner—Maribel Medina

(57) ABSTRACT

A process for the catalytic partial oxidation of a hydrocarbonaceous feedstock with an oxygen-containing gas, wherein a flow of a feed mixture comprising the hydrocarbonaceous feedstock and the oxygen-containing gas is contacted with a catalyst comprising at least one metal selected from Group VIII of the Periodic Table supported on a catalyst carrier to form a conversion product comprising carbon monoxide and hydrogen, wherein the catalyst is retained in a fixed arrangement in a reactor comprising a feed supply chamber which is in fluid communication with the upstream surface of the fixed arrangement, in which process a part of the conversion product formed flows back to the feed supply chamber. The invention further relates to an electrical-energy generating process, an electrical-energy generating system, and transport means provided with this electrical-energy generating system.

17 Claims, 1 Drawing Sheet

PROCESS FOR THE CATALYTIC PARTIAL OXIDATION OF A HYDROCARBONACEOUS FEEDSTOCK

FIELD OF THE INVENTION

The present invention relates to a process for the catalytic partial oxidation of a hydrocarbonaceous feedstock, to a process for the generation of electrical energy comprising the catalytic partial oxidation process, to the use of such electrical-energy generating process in transport means.

Partial oxidation of a hydrocarbonaceous feedstock, in particular hydrocarbons, in the presence of a catalyst is an attractive route for the preparation of mixtures of carbon monoxide and hydrogen, normally referred to as synthesis gas. The partial oxidation of hydrocarbons is an exothermic reaction represented by the equation:

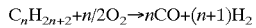

$$C_nH_{2n+2} + n/2 O_2 \rightarrow nCO + (n+1)H_2$$

There is literature in abundance on the catalysts and the process conditions for the catalytic partial oxidation of hydrocarbons. Reference is made, for instance, to EP-A-303 438, U.S. Pat. No. 5,149,464, EP-B-576 096, WO 99/37380, and WO 99/19249.

BACKGROUND OF THE INVENTION

The catalytic partial oxidation process could very suitably be used to provide the hydrogen feed for a fuel cell. In fuel cells, hydrogen and oxygen are passed over the fuel cell in order to produce electricity and water. Fuel cell technology is well known in the art.

One of the most challenging applications of fuel cells is in transportation. Transport means, such as automotive vehicles and crafts, powered by fuel cells are under development. The oxygen needed for the fuel cell may be obtained from the ambient air, the hydrogen feed could be obtained from a hydrogen fuel tank but is preferably produced on-board, for example by catalytic reforming of methanol. The on-board production of hydrogen by catalytic reforming of methanol has been proposed, for example by R. A. Lemons, Journal of Power Sources 29 (1990), p 251–264.

The on-board production of hydrogen by a catalytic partial oxidation process, for example as described in WO99/19249, has been proposed as an alternative for steam reforming of methanol. An important advantage of this catalytic partial oxidation process is its flexibility towards the choice of fuel.

In a catalytic partial oxidation process in a fixed catalyst bed, the temperature of the top layer, i.e. the layer at the upstream end of the catalyst bed, is typically higher than the temperature further downstream in the catalyst bed. This is due to the fact that the catalytic partial oxidation reaction is mass and heat transfer limited, i.e. full conversion is subject to mass and heat transfer limitations between the bulk of the gaseous feed mixture and the catalyst surface.

Typically, upon an increase in the average carbon number of the hydrocarbonaceous feedstock, the temperature of the top layer of the catalyst bed will increase. This is probably due to the fact that if the feedstock has a high carbon number, and thus a high molecular weight, the oxygen concentration at the upstream surface of the catalyst will be relatively high, i.e. higher than the average oxygen concentration in the feed mixture supplied, since the diffusion of the smaller oxygen molecules to the upstream surface will be faster than the diffusion of the larger hydrocarbon molecules. Thus, as the number of carbon atoms increases a larger part of the hydrocarbons will be completely oxidised at the upstream surface of the catalyst bed. Since the complete oxidation reaction is more exothermic than the partial oxidation reaction, more heat is produced, resulting in a very high temperature of the upstream part of the catalyst bed. Temperatures of the top layer of the catalyst bed above 1200° C. have been observed in the catalytic partial oxidation of a naphtha feedstock. It will be appreciated that the temperature of the top layer will not only depend on the feedstock, but also on the catalyst composition and structure, the composition of the feed mixture, the process conditions and the configuration of the reactor.

High temperatures in the top layer of the catalyst bed are unwanted, since the rate of catalyst deactivation increases with temperature. Therefore, there is a need in the art for a catalytic partial oxidation process wherein the temperature in the top layer of the catalyst bed can be reduced.

SUMMARY OF THE INVENTION

It has now be found that, in a process for the catalytic partial oxidation of a hydrocarbonaceous feedstock using a fixed bed catalyst, the temperature of the upstream part of the catalyst bed can be reduced by carrying out the process in a reactor retaining the fixed bed catalyst, which reactor is designed such that a part of the conversion product flows back to the zone just upstream of the catalyst bed.

DETAILED DESCRIPTION OF THE INVENTION

The present invention therefore relates to a process for the catalytic partial oxidation of a hydrocarbonaceous feedstock with an oxygen-containing gas, wherein a flow of a feed mixture comprising the hydrocarbonaceous feedstock and the oxygen-containing gas is contacted with a catalyst comprising at least one metal selected from Group VIII of the Periodic Table supported on a catalyst carrier to form a conversion product comprising carbon monoxide and hydrogen, wherein the catalyst is retained in a fixed arrangement in a reactor comprising a feed supply chamber which is in fluid communication with the upstream surface of the fixed arrangement of catalyst, in which process a part of the conversion product formed flows back to the feed supply chamber.

The catalyst typically comprises a catalytically-active material supported on a high-temperature resistant catalyst carrier, such as a refractory oxide or a metal, preferably an aluminium-containing alloy. Catalytically active materials suitable for the partial oxidation of hydrocarbonaceous feedstocks are known in the art. One or more metals selected from Group VIII of the Periodic Table of the Elements are very suitable as catalytically active material. Rhodium, iridium, palladium and/or platinum are preferred, especially rhodium and/or iridium. Typically, the catalyst comprises the catalytically active metal(s) in a concentration in the range of from 0.02 to 10% by weight, based on the total weight of the catalyst, preferably in the range of from 0.1 to 5% by weight. The catalyst may further comprise a performance-enhancing inorganic metal cation selected from Al, Mg, Zr, Ti, La, Hf, Si, Ce and Ba, which is present in intimate association supported on or with the catalytically active metal, preferably a zirconium cation.

In the process of the present invention, the catalyst is retained in a reactor in the form of a fixed arrangement. The fixed arrangement may be in any suitable form, provided that it is permeable to gas. Examples of suitable fixed arrangements of catalyst are a fixed bed of catalyst particles, arrangements comprising a metal or ceramic monolithic structure as catalyst carrier, such as a foam or a honeycomb, or comprising an arrangement of metal wire, foil or gauze as catalyst carrier, or combinations thereof.

The fixed arrangement of catalyst is retained in a reactor wherein a feed mixture comprising a hydrocarbonaceous feedstock and an oxygen-containing gas is supplied to a feed supply chamber. The feed supply chamber is the space upstream of and in fluid communication with the fixed arrangement. A flow of the feed mixture will thus be contacted with the catalyst and converted in a gaseous product comprising carbon monoxide and hydrogen.

In the process according to the invention, part of the conversion product formed flows back to the feed supply chamber. The conversion product flows back internally, i.e. through the fixed arrangement of catalyst. Consequently, the flow of the feed mixture in the feed supply chamber entrains the flown back conversion product.

Preferably at least 5% (v/v) of the conversion product formed flows back to the feed supply chamber, more preferably at least 10%, even more preferably at least 20%. Preferably at most 80% (v/v) of the conversion product formed flows back to the feed supply chamber, more preferably at most 60% (v/v).

Back-flow of conversion product will be facilitated if the pressure drop over the catalyst is low. A low pressure drop can be achieved by using a fixed arrangement of catalyst wherein the length in the direction of the flow path is small and/or the void fraction is high. Preferably, the void fraction of the fixed arrangement of catalyst is in the range of from 0.6 to 0.98, more preferably of from 0.7 to 0.95.

However, a small length and/or a high void fraction can result in incomplete conversion of the feedstock. Therefore, in a preferred embodiment of the invention, the fixed arrangement of catalyst comprises a first and a second layer which are spaced apart from each other, wherein the first layer is located upstream of the second layer and wherein a part of the conversion product formed in the first layer flows back to the feed supply chamber. The pressure drop over the first layer is kept sufficient low to facilitate back-flow of part of the conversion product formed in the first layer to the feed supply chamber and in the second layer the conversion is further completed. In order to minimise the pressure drop over the first layer, the first layer preferably has a length which is smaller and/or a void fraction which is higher than that of the second layer.

Part of the conversion product formed is fed back to the feed supply chamber through the fixed arrangement of catalyst or, in case of a fixed arrangement of catalyst comprising two or more layers, through the first layer of the fixed arrangement of catalyst. Internal back-flow of conversion product is facilitated if the flow of the feed mixture in the feed supply chamber is such that the flow sucks in part of the conversion product.

A suitable way of achieving that the flow of feed mixture sucks in part of the conversion product through the fixed arrangement of catalyst is by ejecting a flow of the feed mixture from a nozzle to the upstream surface of the fixed arrangement of catalyst, in such a way that the flow impinges on at most half of the area of the upstream surface. Preferably, the area of the upstream surface of the fixed arrangement of catalyst on which the flow impinges is at most a third of the total area of the upstream surface of the fixed arrangement of catalyst, more preferably at most a fifth. This can, for example, be achieved by choosing a nozzle having an internal diameter which is relatively small with respect to the diameter of the upstream surface. Preferably, the ratio of the diameter of the upstream surface of the fixed arrangement of catalyst and the inner diameter of the nozzle is at least 5, more preferably at least 7. Reference herein to a flow impinging on the catalyst is to a flow having a component of its average linear velocity directed into the catalyst.

Another suitable way of achieving that the flow of feed mixture sucks in part of the conversion product through the fixed arrangement of catalyst is by creating a flow of feed mixture which is parallel to the upstream surface of the fixed arrangement of catalyst. The flow may be ejected from a nozzle in the direction parallel to the upstream surface. It will be appreciated that the sucking action of the flow will increase with the linear velocity of the flow. Alternatively, and more preferred, the flow is swirling in the feed supply chamber in the direction parallel to the upstream surface. The swirl movement of the flow may for example be achieved by supplying the feed mixture to the feed supply chamber via a tangential inlet opening, thus creating a wall jet of the feed mixture, or by placing a swirl body in the feed supply chamber. In case of a swirling flow, the conversion product will not only be sucked in by the parallel flow of feed mixture, but will additionally be drawn into the centre of the swirl.

The process of the present invention is especially advantageous if the catalyst carrier comprises a metal alloy. Metal alloys, preferably in the form of a metal foam or an arrangements of metal gauze, wire or foil, are very suitable catalyst carrier materials for catalytic partial oxidation processes, because they are very resistant to thermal shocks. A disadvantage of metal alloys, however, is that the metal can melt at very high temperatures, i.e. typically above 1400° C. In the process according to the present invention, very high temperatures are avoided such that metal alloys can advantageously be used as catalyst carrier. Preferably, the metal alloy is an aluminium-containing alloy, more preferably an alloy comprising iron, chromium and aluminium, such as Fecralloy-type materials.

Metal alloy catalyst carriers are preferably coated with a stabilised or partially stabilised zirconia. The zirconia layer is coated on the catalyst carrier prior to applying the catalytically active metal(s) on it.

The stabilised or partially stabilised zirconia may be coated on the catalyst carrier by techniques known in the art, preferably by means of washcoating techniques such as spraying, dipping or direct application of a sol or suspension of zirconia. Preferably, the carrier is dried and calcined after washcoating. The sol or suspension of zirconia may comprise small amount of other oxides or binders, for example alumina. Preferably, the amount of other oxides or binders is less than 20% by weight, based on the amount of stabilised zirconia, more preferably less than 10% by weight.

Preferably, the zirconia is stabilised with one or more oxides selected from oxides of Ca, Mg, Al, Ce, La, and Y, more preferably selected from Ca and Y. Preferably, the amount of stabiliser is in the range of from 1 to 10% by weight, based on the weight of stabilised zirconia, preferably in the range of from 3 to 7% by weight.

Preferably, the amount of stabilised or partially stabilised zirconia coated on the catalyst carrier is in the range of from 1 to 40% by weight, based on the weight of catalyst carrier, more preferably in the range of from 2 to 30% by weight, even more preferably in the range of from 3 to 15% by weight.

Suitable hydrocarbonaceous feedstocks for the process according to the invention comprise hydrocarbons, oxygenates or mixtures thereof. Oxygenates are defined as molecules containing apart from carbon and hydrogen atoms at least 1 oxygen atom which is linked to either one or two carbon atoms or to a carbon atom and a hydrogen atom. Examples of suitable oxygenates are methanol, ethanol, dimethyl ether and the like. The hydrocarbonaceous feedstock is gaseous when contacting the catalyst, but may be liquid under standard temperature and pressure (STP) conditions, i.e. at 0° C. and 1 atmosphere. Preferred hydrocarbonaceous feedstocks are hydrocarbons. The process according to the present invention is especially advantageous if the feedstock is a hydrocarbon stream having an average carbon number of at least 2. Preferably, the feedstock is a hydrocarbon stream having an average carbon number of at least 6.

The oxygen-containing gas may be oxygen, air, or oxygen-enriched air, preferably air.

The hydrocarbonaceous feedstock and the oxygen-containing gas are preferably present in the feed mixture in such amounts as to give an oxygen-to-carbon ratio in the range of from 0.3 to 0.8, more preferably in the range of from 0.35 to 0.65. References herein to the oxygen-to-carbon ratio refer to the ratio of oxygen in the form of molecules ($O_2$) to carbon atoms present in the hydrocarbonaceous feedstock. If oxygenate feedstocks are used, e.g. ethanol, oxygen-to-carbon ratios below 0.3 can suitably be used.

Preferably, the feed mixture additionally comprises steam. If steam is present, the steam-to-carbon ratio is preferably in the range of from above 0.0 to 3.0, more preferably of from above 0.0 to 2.0.

The feed mixture may be contacted with the catalyst at any suitable gas hourly space velocity (GHSV). In the process according to the invention, the GHSV will be typically in the range of from 20,000 to 10,000,000 Nl/kg/h.

The feed mixture may be contacted with the catalyst at a pressure up to 100 bar (absolute), preferably in the range of from 1 to 50 bar (absolute), more preferably of from 2 to 30 bar (absolute).

The process of this invention could very suitably be used to provide the hydrogen feed for a fuel cell. It is preferred to enrich the synthesis gas in hydrogen and to substantially remove the carbon monoxide present, prior to using synthesis gas as a hydrogen source for fuel cells. Suitable methods to achieve this are known in the art. It is preferred to increase the hydrogen content of the synthesis gas by means of a water gas shift reaction:

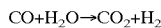

$CO+H_2O \rightarrow CO_2+H_2$

The carbon dioxide thus-obtained may be removed by methods known in the art. The residual carbon monoxide can suitably be removed by selective oxidation or, together with the carbon dioxide, by membrane separation.

Accordingly, the present invention also relates to a process to generate electrical energy comprising the following steps:
(a) the preparation of a mixture comprising hydrogen and carbon monoxide according to the process of this invention; and
(b) the conversion of at least part of the hydrogen prepared in step (a) into electrical energy and water by means of a fuel cell.

Fuel cells are very suitable to apply in transport means, in particular automotive vehicles or crafts. Accordingly, another aspect of the present invention relates to the use of the above-defined process to generate electrical energy in transport means.

BRIEF DESCRIPTION OF THE FIGURES

The invention will now be illustrated by means of schematic FIGS. 1 and 2.

DETAILED DESCRIPTION OF THE FIGURES

Similar parts of the reactors of different Figures have the same referral number. The direction of the flow of the feed mixture and the conversion product is indicated by arrows.

Figure 1:
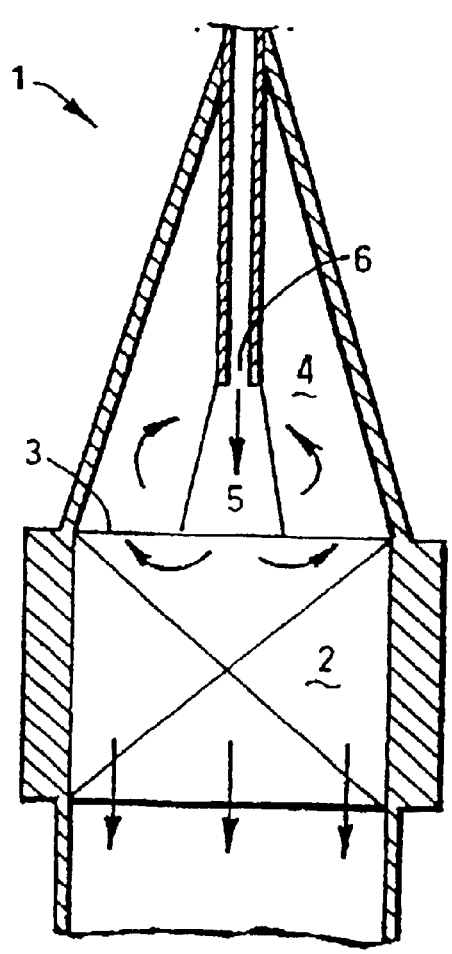
FIG. 1 shows a cross section of part of a first reactor suitable for the process according to the present invention.

The reactor 1 of FIG. 1 comprises a catalyst in the form of a fixed arrangement 2. The upstream surface 3 of the fixed arrangement of catalyst 2 is in fluid communication with feed supply chamber 4. A flow 5 of feed mixture is ejected from a nozzle 6 into feed supply chamber 4. Part of the conversion product flows back through the fixed arrangement of catalyst 2 to the feed supply chamber 4 due to the sucking action of the flow 5 and is entrained by the flow 5 of feed mixture.

Figure 2:
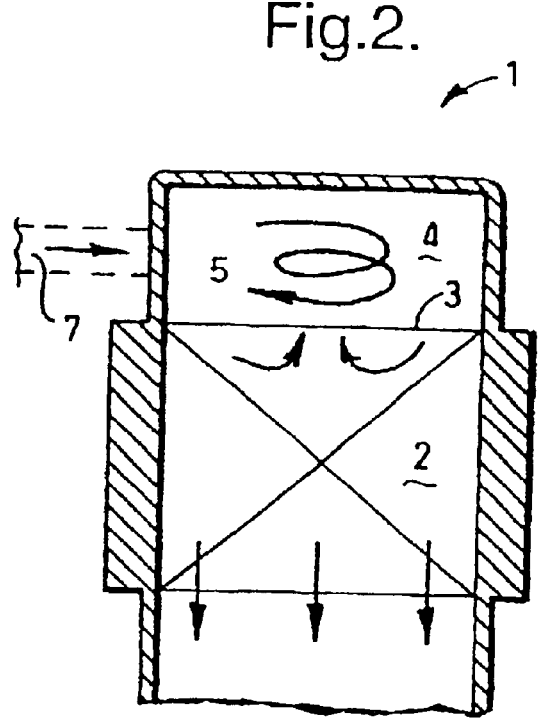
FIG. 2 shows a cross section of part of a second reactor suitable for the process according to the present invention.

In reactor 1 shown in FIG. 2, the feed mixture is tangentially introduced by means of supply conduit 7 into feed supply chamber 4, thus creating a swirling flow 5 of feed mixture. Part of the conversion product flows back through the fixed arrangement of catalyst 2 to the feed supply chamber 4 due to the sucking action of the flow 5 and is entrained by the flow 5 of feed mixture.

The invention will be illustrated in more detail on the basis of the following examples together with the figures. The examples should not be construed to limit the scope of the invention.

EXAMPLE 1

According to the Invention

Catalyst Preparation

An arrangement of knitted and pressed fecralloy wire (wire diameter 0.2 mm; ex. Resistalloy, UK) comprising 72.6% wt Fe, 22% wt Cr, 5.3% wt Al, and 0.1% wt Y, and having a diameter of 34 mm, a length of 25 mm, and a void fraction of 0.86, was calcined for 48 hours at 1050° C. The calcined arrangement was once dipcoated in a commercially available partially-stabilised zirconia (Zirconium oxide, type ZO; ex. ZYP Coatings Inc., Oak Ridge, U.S.A.). The zirconia is partially-stabilised with 4% wt CaO. After dipcoating, the arrangement was calcined for 2 hours at 700° C. The thus-obtained arrangement contained 4.5% by weight partially-stabilised zirconia, based on the weight of fecralloy.

The coated arrangement was further provided with 0.9% wt Rh, 0.08% wt Pt, and 1.4% wt Zr, based on the total weight of the catalyst, by immersing it twice in an aqueous solution comprising rhodium trichloride, hexachioroplatinic acid and zirconyl nitrate. After each immersion, the arrangement was dried at 140° C. and calcined for 2 hours at 700° C.

Catalytic Partial Oxidation

The above-described catalyst was retained in a reactor having a configuration as shown in FIG. 1. The nozzle had an inner diameter of 3.5 mm and was placed at a distance of 17 mm from the upstream surface of the arrangement. The diameter of the upstream surface of the catalyst was 34 mm.

A gaseous flow of feed mixture consisting of naphtha (3 kg/h), air and steam and having a temperature of 300° C. was ejected from the nozzle to the upstream surface of the catalyst. The amounts of air and steam in the feed mixture were such that the oxygen-to-carbon ratio was 0.45 and the steam-to-carbon ratio 0.9. The pressure was 5.1 bar (absolute).

The temperature in the top layer of the catalyst was measured by means of a pyrometer. The composition of the gas mixture in the feed supply chamber was measured.

The temperature in the top layer of the catalyst bed was 960° C. and conversion gases, i.e. $H_2$, CO and $CO_2$, were found in the feed supply chamber.

EXAMPLE 2

According to the Invention

Catalyst Preparation

A fecralloy arrangement dipcoated with partially-stabilised zirconia and subsequently calcined was prepared as described in EXAMPLE 1. The thus-obtained arrangement contained 4.6% by weight partially-stabilised zirconia, based on the weight of fecralloy.

The coated arrangement was further provided with 1.0% wt Rh, 1.0% wt Ir, and 2.9% wt Zr, based on the total weight of the catalyst, by immersing it three times in an aqueous solution comprising rhodium trichloride, iridium tetrachloride, and zirconyl nitrate. After each immersion, the arrangement was dried at 140° C. and calcined for 2 hours at 700° C.

Catalytic Partial Oxidation

The above-described catalyst was retained in a reactor having a configuration as shown in FIG. 2. The diameter of the upstream surface of the catalyst was 34 mm. A gaseous flow of feed mixture, having the same composition and temperature as that in EXAMPLE 1, was tangentially supplied to the feed supply chamber such that the flow of feed mixture was swirling in the feed supply chamber. The pressure was 4.9 bar (absolute).

The temperature in the top layer of the catalyst was 1050° C.

EXAMPLE 3

Comparative

Catalyst Preparation

A fecralloy arrangement dipcoated with partially-stabilised zirconia and subsequently calcined was prepared as described in EXAMPLE 1. The thus-obtained arrangement contained 5.0% by weight partially-stabilised zirconia, based on the weight of fecralloy.

The coated arrangement was further provided with 0.6% wt Rh, 0.05% wt Pt, and 0.9% wt Zr, based on the total weight of the catalyst, by immersing it twice in an aqueous solution comprising rhodium trichloride, hexachloroplatinic acid and zirconyl nitrate. After each immersion, the arrangement was dried at 140° C. and calcined for 2 hours at 700° C.

Catalytic Partial Oxidation

The above-described catalyst was retained in a reactor having a configuration similar to that shown in FIG. 1, but with a wider nozzle and a larger distance between the nozzle and the upstream surface of the catalyst. The inner diameter of the nozzle was 10 mm and the distance between the nozzle and the upstream surface of the catalyst was 48 mm. The diameter of the upstream surface of the catalyst was 34 mm.

A gaseous flow having the same composition and temperature as that in EXAMPLE 1 was ejected from the nozzle to the catalyst bed. The ejected flow was impinging upon the whole area of the upstream surface. The pressure was 4.5 bar (absolute).

The temperature in the top layer of the catalyst bed was 1200° C. No conversion gases such as $H_2$, CO or $CO_2$ were found in the feed supply chamber.

What is claimed is:

1. A process for the catalytic partial oxidation of a hydrocarbonaceous feedstock with an oxygen-containing gas, said process comprising:

contacting a flow of a feed mixture comprising the hydrocarbonaceous feedstock and the oxygen-containing gas, with a catalyst comprising at least one metal selected from Group VIII of the Periodic Table supported on a catalyst carrier, wherein said catalyst is retained in a fixed arrangement in a reactor comprising a feed supply chamber which is in fluid communication with an upstream surface of the fixed arrangement of catalyst;

forming a conversion product comprising carbon monoxide and hydrogen; and, flowing a part of the conversion product back through the fixed arrangement of catalyst to the feed supply chamber;

wherein the fixed arrangement of catalyst comprises a first and a second layer which are spaced apart from each other, wherein the first layer is located upstream of the second layer, the length of the first layer is smaller than the length of the second layer and wherein a part of the conversion product formed in the first layer flows back to the feed supply chamber.

2. The process according to claim 1, wherein at least 5% (v/v) of the conversion product flows back to the feed supply chamber.

3. The process according to claim 1, wherein the void fraction of the first layer is higher than the void fraction of the second layer.

4. The process according to claim 1, wherein the fixed arrangement of catalyst or the first layer of the fixed arrangement of catalyst has a void fraction in the range of from about 0.6 to about 0.98.

5. The process according to claim 1, wherein the catalyst carrier or the catalyst carrier of the first layer of the fixed arrangement of catalyst comprises a metal alloy.

6. The process according to claim 5, wherein the metal alloy is coated with a stabilized or partially stabilized zirconia.

7. The process according to claim 5, wherein the metal catalyst carrier is a metal foam or an arrangement of metal gauze, foil or wire.

8. The process according to claim 1, wherein the hydrocarbonaceous feedstock is a hydrocarbon stream having an average carbon number of at least about 2.

9. The process according to claim 1, wherein the oxygen-containing gas is air.

10. The process according to claim 1, wherein the feed mixture additionally comprises steam.

11. The process according to claim 1, wherein the temperature of the upstream surface of the fixed arrangement is below about 1100° C.

12. A process for the catalytic partial oxidation of a hydrocarbonaceous feedstock with an oxygen-containing gas, said process comprising:

contacting a flow of a feed mixture comprising the hydrocarbonaceous feedstock and the oxygen-containing gas, with a catalyst comprising at least one metal selected from Group VIII of the Periodic Table supported on a catalyst carrier, wherein said catalyst is retained in a fixed arrangement in a reactor comprising a feed supply chamber which is in fluid communication with an upstream surface of the fixed arrangement of catalyst;

forming a conversion product comprising carbon monoxide and hydrogen; and, flowing a part of the conversion product back through the fixed arrangement of catalyst to the feed supply chamber, wherein the flow of feed mixture in the feed supply chamber is such that the flow sucks in part of the conversion product and wherein the flow of feed mixture is ejected from a nozzle to the upstream surface of the fixed arrangement of catalyst in such a way that the flow is impinging on at most half of the total area of the upstream surface of the catalyst.

13. The process according to claim 12, wherein the ratio of the diameter of the upstream surface of the catalyst and the inner diameter of the nozzle is at least about 5.

14. The process according to claim 12, wherein the flow of feed mixture is parallel to the upstream surface of the catalyst.

15. The process according to claim 14, wherein the flow of feed mixture is swirling in the direction parallel to the upstream surface of the catalyst.

16. A process for the generation of electrical energy comprising:

(a) contacting a flow of a feed mixture comprising a hydrocarbonaceous feedstock and an oxygen-containing gas, with a catalyst comprising at least one metal selected from Group VIII of the Periodic Table supported on a catalyst carrier, wherein said catalyst is retained in a fixed arrangement in a reactor comprising a feed supply chamber which is in fluid communication with an upstream surface of the fixed arrangement of catalyst;

forming a conversion product comprising carbon monoxide and hydrogen; and, flowing a part of the conversion product back through the fixed arrangement of catalyst to the feed supply chamber, wherein the fixed arrangement of catalyst comprises a first and a second layer which are spaced apart from each other, wherein the first layer is located upstream of the second layer, the length of the first layer is smaller than the length of the second layer and wherein a part of the conversion product formed in the first layer flows back to the feed supply chamber; and, (b) converting at least part of the hydrogen prepared in step (a) into electrical energy and water by means of a fuel cell.

17. The process of claim 16 wherein said process is performed in a means for transport.

* * * * *